United States Patent
Yamamoto et al.

(10) Patent No.: US 10,103,656 B2
(45) Date of Patent: Oct. 16, 2018

(54) VEHICLE WITH CONTROLLER FOR PERFORMING PULSE WIDTH MODULATION CONTROL

(71) Applicant: TOYOTA JIDOSHA KABUSHIKI KAISHA, Toyota-shi, Aichi-ken (JP)

(72) Inventors: Toshihiro Yamamoto, Toyohashi (JP); Kenji Yamada, Komaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/496,236

(22) Filed: Apr. 25, 2017

(65) Prior Publication Data

US 2017/0317620 A1    Nov. 2, 2017

(30) Foreign Application Priority Data

Apr. 28, 2016  (JP) ................. 2016-091160

(51) Int. Cl.
| | |
|---|---|
| *H02P 6/15* | (2016.01) |
| *B60L 11/18* | (2006.01) |
| *H02P 6/08* | (2016.01) |
| *H02P 27/08* | (2006.01) |
| *H02M 7/5395* | (2006.01) |

(52) U.S. Cl.
CPC .......... *H02P 6/153* (2016.02); *B60L 11/1803* (2013.01); *H02M 7/5395* (2013.01); *H02P 6/085* (2013.01); *H02P 27/085* (2013.01); *B60L 2210/40* (2013.01)

(58) Field of Classification Search
CPC . B60L 11/1803; H02M 7/5395; H02P 27/085; H02P 6/085
See application file for complete search history.

(56) References Cited

U.S. PATENT DOCUMENTS

| | | | |
|---|---|---|---|
| 2009/0115362 A1* | 5/2009 | Saha .................. | B60K 6/26 318/400.09 |
| 2009/0237019 A1* | 9/2009 | Yamakawa ........... | H02P 23/009 318/400.09 |
| 2010/0134053 A1 | 6/2010 | Yamada et al. | |

(Continued)

FOREIGN PATENT DOCUMENTS

| | | |
|---|---|---|
| JP | 2007-306679 A | 11/2007 |
| JP | 2010-154735 A | 7/2010 |

(Continued)

*Primary Examiner* — Muhammad S Islam
(74) *Attorney, Agent, or Firm* — Finnegan, Henderson, Farabow, Garrett & Dunner, LLP

(57) ABSTRACT

A vehicle performs first PWM control of generating a first PWM signal of a plurality of switching elements to switch the plurality of switching elements by comparing voltage commands of phases based on a torque command with a carrier voltage when a target operating point including a rotation speed and the torque command of the motor is outside a predetermined area, and selects and performs second PWM control of generating a second PWM signal of the plurality of switching elements to switch the plurality of switching elements based on a modulation factor of a voltage and a voltage phase based on the torque command and the number of pulses in a predetermined period of an electrical angle of the motor or the first PWM control when the target operating point is inside the predetermined area.

10 Claims, 8 Drawing Sheets

(56) References Cited

U.S. PATENT DOCUMENTS

| | | |
|---|---|---|
| 2011/0273125 A1 | 11/2011 | Yamada et al. |
| 2013/0200830 A1 | 8/2013 | Suzuki et al. |
| 2014/0001990 A1* | 1/2014 | Takamatsu .............. H02P 27/08 318/400.22 |
| 2014/0340007 A1 | 11/2014 | Suhama et al. |

FOREIGN PATENT DOCUMENTS

| | | |
|---|---|---|
| JP | 2012-050259 A | 3/2012 |
| JP | 2013-062970 A | 4/2013 |
| JP | 2013-162660 | 8/2013 |
| JP | 2013-187933 A | 9/2013 |
| JP | 2013-215041 A | 10/2013 |
| JP | 5352330 B2 | 11/2013 |
| JP | 2014-75937 | 4/2014 |
| JP | 5594301 | 9/2014 |
| JP | 2015-53824 | 3/2015 |
| JP | 2015-156755 | 8/2015 |
| JP | 2015-173549 A | 10/2015 |
| WO | WO 2015/125586 A1 | 8/2015 |

* cited by examiner

VEHICLE WITH CONTROLLER FOR PERFORMING PULSE WIDTH MODULATION CONTROL

INCORPORATION BY REFERENCE

The disclosure of Japanese Patent Application No. 2016-091160 filed on Apr. 28, 2016 including the specification, drawings and abstract is incorporated herein by reference in its entirety.

BACKGROUND

1. Technical Field

The disclosure relates to a vehicle and more particularly to a vehicle including a motor, an inverter, and a battery.

2. Description of Related Art

As such a type of vehicle, a vehicle which includes an electric motor and a power conversion device having an inverter circuit that drives the electric motor by switching a plurality of switching elements and in which pulse signals of the plurality of switching elements are generated based on the number of pulses in one electrical period of the electric motor and a modulation factor of a voltage and a voltage phase based on a torque command of the electric motor to switch the plurality of switching elements has been proposed (for example, see Japanese Patent Application Publication No. 2013-162660 (JP 2013-162660 A). In such a vehicle, loss reduction in a drive system including the power conversion device and the electric motor as a whole is achieved by generating pulse signals to minimize power loss of the power conversion device and the electric motor based on the number of pulses, the modulation factor, and the voltage phase (a first technique).

As such a type of vehicle, a vehicle which includes a motor and an inverter that drives the motor by switching a plurality of switching elements and in which PWM signals of the plurality of switching elements are generated by comparing voltage commands of phases based on a torque command of the motor with a carrier voltage to switch the plurality of switching elements has also been proposed (for example, see Japanese Patent Application Publication No. 2014-75937 (JP 2014-75937 A)) (a second technique).

SUMMARY

However, in the first technique, basically, a period in which the pulse signals (the PWM signals) are generated is longer and responsiveness (adherence to an operating point when a target operating point changes) of the electric motor (the motor) is lower in comparison with in the second technique. Depending on the target operating point of the electric motor, the loss may not change using either of the first technique or the second technique. Accordingly, use of the first technique cannot be said to be suitable. In consideration of the loss or the like, use of the second technique cannot be said to be suitable.

The disclosure provides a vehicle that more suitably drives an electric motor (a motor).

A vehicle according to a first aspect of the disclosure includes, a motor configured to drive a vehicle, an inverter configured to drive the motor by switching a plurality of switching elements, a battery configured to exchange power with the motor via the inverter, and an electronic control unit configured to control the inverter based on a torque command of the motor. The electronic control unit is configured to perform first PWM control of generating a first PWM signal of the plurality of switching elements to switch the plurality of switching elements by comparing voltage commands of phases based on the torque command with a carrier voltage when a target operating point including a rotation speed and the torque command of the motor is outside a predetermined area, and to select and perform second PWM control of generating a second PWM signal of the plurality of switching elements to switch the plurality of switching elements based on a modulation factor of a voltage and a voltage phase based on the torque command and the number of pulses in a predetermined period of an electrical angle of the motor or the first PWM control when the target operating point is inside the predetermined area.

When the first PWM control is performed, responsiveness (adherence to an operating point when a target operating point changes) of the motor can be improved in comparison with when the second PWM control is performed. When the second PWM control is performed, the core loss of the motor or the harmonics can be reduced in comparison with when the first PWM control is performed, by generating the second PWM signal to reduce (for example, to minimize) the core loss of the motor or generating the second PWM signal to reduce (for example, to minimize) harmonics of a voltage or a current (particularly, low-order harmonics such as rotational sixth harmonics and rotational twelfth harmonics of the motor). Accordingly, according to the above-mentioned aspect, when a predetermined area is determined as an area in which an effect of performing the second PWM control can be expected to a certain extent, it is possible to more suitably drive the motor depending on the target operating point.

In the aspect, the electronic control unit may be configured to generate the first PWM signal at a first interval corresponding to half a period of the carrier voltage or a period of the carrier voltage when performing the first PWM control and to generate the second PWM signal at a second interval longer than the first interval when performing the second PWM control.

In the aspect, the electronic control unit may be configured to set a switching angle based on the modulation factor, the number of pulses, and the voltage phase, to set a switching pattern based on the number of pulses, and to generate the second PWM signal based on the switching angle and the switching pattern when generating the second PWM signal. Here, the "switching angle" refers to an angle for switching a phase voltage of each phase of the motor (ON and OFF of the switching element of the corresponding phase among the plurality of switching elements). The "switching pattern" refers to a combination of ONs and OFFs of the plurality of switching elements. In this case, the switching reference angle may be set based on the modulation factor and the number of pulses and the switching angle may be set based on the switching reference angle and the voltage phase.

In the aspect, the electronic control unit may be configured to perform the first PWM control when the target operating point is inside the predetermined area and the modulation factor is less than a predetermined modulation factor. The inventor found that an effect of performing the second PWM control is relatively small when the target operating point is inside the predetermined area and the modulation factor is relatively small. Accordingly, it is possible to more suitably drive the motor by performing the first PWM control to improve responsiveness of the motor.

In the aspect, the electronic control unit may be configured to set the number of pulses based on the target operating point and the modulation factor when the target operating point is inside the predetermined area. Accordingly, the number of pulses can be set to be more suitable and the second PWM signal can be more suitably generated, thereby satisfactorily driving the motor.

In the aspect, the electronic control unit may be configured to set the number of pulses based on the target operating point and the modulation factor, to set one of a plurality of types including a type of generating the second PWM signal to reduce a core loss of the motor and a type of generating the second PWM signal to reduce harmonics as a selected type, and to generate the second PWM signal based on the modulation factor, the voltage phase, the number of pulses, and the selected type when the target operating point is inside the predetermined area. Accordingly, the number of pulses and the type can be set to be more suitable and the second PWM signal can be more suitably generated, thereby satisfactorily driving the motor.

In the aspect, the electronic control unit may be configured to set the number of pulses to be smaller in an area in which the modulation factor is relatively large than in an area in which the modulation factor is relatively small.

In the aspect, the electronic control unit may be configured to perform the first PWM control even when the target operating point is inside the predetermined area, a state of a drive system including the motor, the inverter, and the battery suddenly changes, or the sudden change of the drive system is predicted. When the second PWM control is performed, the responsiveness of the motor is lower than that when the first PWM control is performed. Accordingly, when the state of the drive system suddenly changes or a sudden change of the state of the drive system is predicted, it is possible to more satisfactorily drive the motor by performing the first PWM control to improve the responsiveness of the motor even when the target operating point is inside the predetermined area.

In the aspect, the electronic control unit may be configured to determine that the state of the drive system has suddenly changed and to perform the first PWM control when a variation per unit time of at least one of the torque command, the rotation speed, the voltage of the inverter, and the voltage of the battery is greater than a threshold value. Accordingly, it is possible to determine whether the state of the drive system has suddenly changed based on the torque command, the rotation speed, the voltage of the inverter, and the voltage of the battery.

In the aspect, the electronic control unit may be configured to determine that the sudden change of the state of the drive system is predicted and to perform the first PWM control when a travel road is a low-µ road. Accordingly, it is possible to determine whether the sudden change of the state of the drive system is predicted based on the travel road. Here, the "low-µ road" refers to a travel road on which the vehicle is likely to slip due to idling of driving wheels such as a wet road surface, a snowy road, or a frozen road The electronic control unit may be configured to set the number of pulses based on the target operating point and the modulation factor, to set one of a plurality of types including a type of generating the second PWM signal to reduce a core loss of the motor, a type of generating the second PWM signal to reduce an ohmic loss of the motor, a type of generating the second PWM signal to reduce a torque ripple of the motor, a type of generating the second PWM signal to reduce a loss of the inverter, a type of generating the second PWM signal to reduce a total loss of the motor and the inverter, a type of generating the second PWM signal to reduce harmonics of a voltage, and a type of generating the second PWM signal to reduce harmonics of a current as a selected type, and to generate the second PWM signal based on the modulation factor, the voltage phase, the number of pulses, and the selected type when the target operating point is inside the predetermined area.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to an example.

Figure 1:
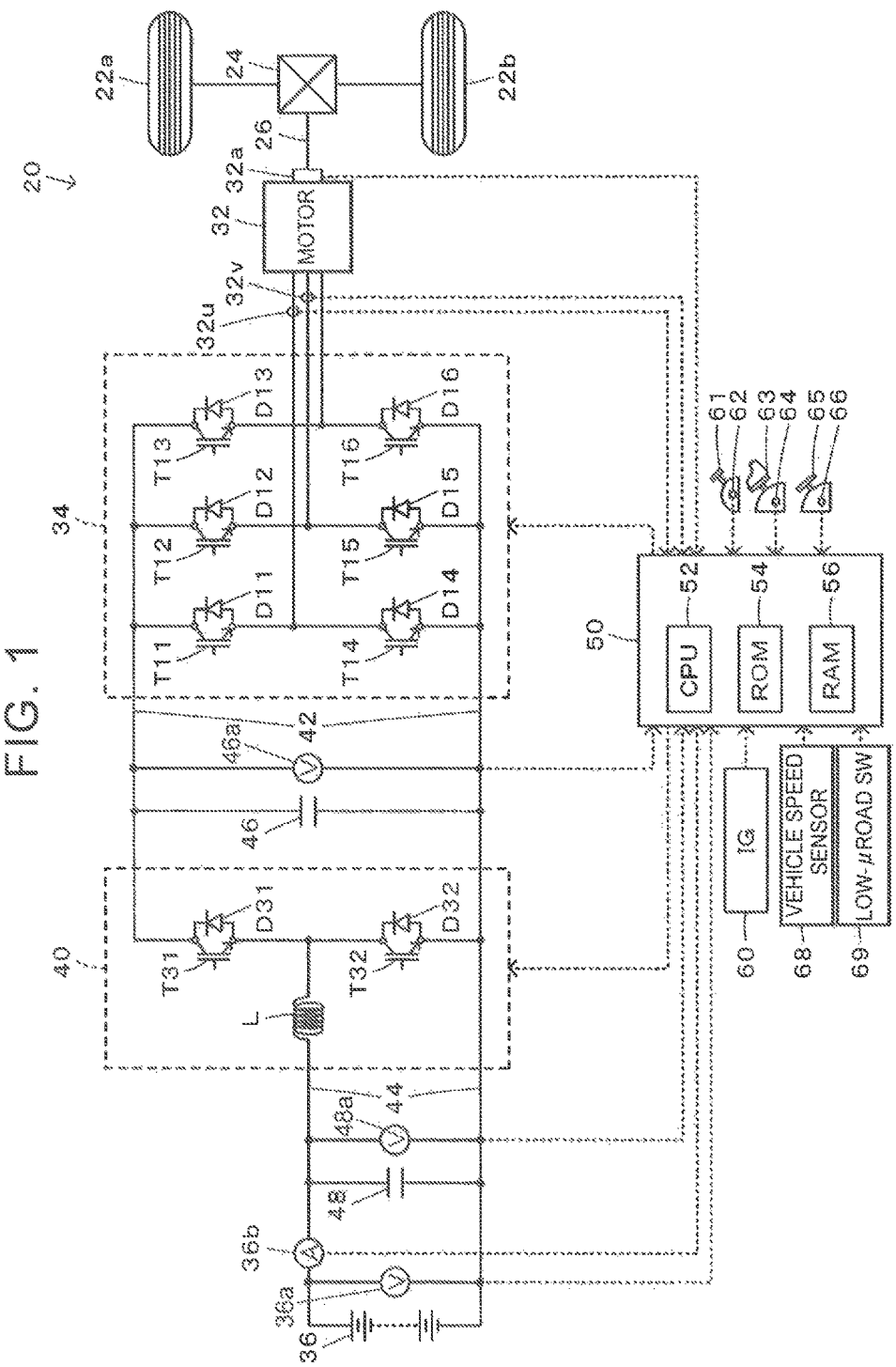
FIG. 1 is a diagram schematically illustrating a configuration of an electric vehicle according to an embodiment of the disclosure.

FIG. 1 is a diagram schematically illustrating a configuration of an electric vehicle 20 according to an embodiment of the disclosure. The electric vehicle 20 according to the embodiment includes a motor 32, an inverter 34, a battery 36, a boost converter 40, and an electronic control unit 50 as illustrated in the drawing.

The motor 32 is constituted by a synchronous generator-motor and includes a rotor in which a permanent magnet is embedded and a stator on which a three-phase coil is wound. The rotor of the motor 32 is connected to a drive shaft 26 which is connected to driving wheels 22a and 22b via a differential gear 24.

The inverter 34 is connected to the motor 32 and is also connected to the boost converter 40 via a high-voltage power line 42. The inverter 34 includes six transistors T11 to T16 and six diodes D11 to D16. The transistors T11 to T16 are arranged as pairs of two transistors to serve as a source side and a sink side with respect to a positive bus bar and a negative bus bar of the high-voltage power line 42. The six diodes D11 to D16 are connected in reverse parallel to the transistors T11 to T16, respectively. The three-phase coil (a U phase, a V phase, and a W phase) of the motor 32 is connected to junction points between the transistors constituting the pairs of the transistors T11 to T16. Accordingly, when a voltage is applied to the inverter 34, a rotating magnetic field is formed in the three-phase coil and the motor 32 is rotationally driven by causing the electronic control unit 50 to adjust a ratio of ON-time of each pair of transistors T11 to T16. Hereinafter, the transistors T11 to T13 may be referred to as an "upper arm" and the transistors T14 to T16 may be referred to as a "lower arm." A smoothing capacitor 46 is connected to the positive bus bar and the negative bus bar of the high-voltage power line 42.

The battery 36 is constituted by, for example, a lithium ion secondary battery or a nickel hydrogen secondary battery and is connected to the boost converter 40 via a low-voltage power line 44. A smoothing capacitor 48 is connected to a positive bus bar and a negative bus bar of the low-voltage power line 44.

The boost converter 40 is connected to the high-voltage power line 42 and the low-voltage power line 44. The boost converter 40 includes two transistors T31 and T32, two diodes D31 and D32, and a reactor L. The transistor T31 is connected to the positive bus bar of the high-voltage power line 42. The transistor T32 is connected to the transistor T31 and the negative bus bars of the high-voltage power line 42 and the low-voltage power line 44. The two diodes D31 and D32 are connected in reverse parallel to the transistors T31 and T32, respectively. The reactor L is connected to a junction point between the transistors T31 and T32 and the positive bus bar of the low-voltage power line 44. By causing the electronic control unit 50 to adjust a ratio of ON-time of the transistors T31 and T32, the boost converter 40 supplies power of the low-voltage power line 44 to the high-voltage power line 42 with step-up of a voltage or supplies power of the high-voltage power line 42 to the low-voltage power line 44 with step-down of a voltage.

The electronic control unit 50 is constituted as a microprocessor including a CPU 52, and includes a ROM 54 storing a processing program, a RAM 56 temporarily storing data, and an input and output port in addition to the CPU 52.

Signals from various sensors are input to the electronic control unit 50 via the input port. Examples of the signals input to the electronic control unit 50 include a rotational position θm from a rotational position sensor 32a (for example, a resolver) that detects a rotational position of the rotor of the motor 32 and phase currents Iu and Iv from current sensors 32u and 32v that detect currents flowing in the phases of the motor 32. Examples of the input signals further include a voltage VB from a voltage sensor 36a connected between terminals of the battery 36 and a current IB from a current sensor 36b connected to an output terminal of the battery 36. Examples of the input signals further include a voltage VH of the capacitor 46 (the high-voltage power line 42) from a voltage sensor 46a connected between terminals of the capacitor 46 and a voltage VL of the capacitor 48 (the low-voltage power line 44) from a voltage sensor 48a connected between terminals of the capacitor 48. Examples of the input signals further include an ignition signal from an ignition switch 60, a shift position SP from a shift position sensor 62 that detects an operation position of a shift lever 61, an accelerator opening Ace from an accelerator pedal position sensor 64 that detects a degree of stepping on an accelerator pedal 63, and a brake pedal position BP from a brake pedal position sensor 66 that detects a degree of stepping on a brake pedal 65. Examples of the input signals further include a vehicle speed VS from a vehicle speed sensor 68 and a low-μ road switch signal from a low-μ road switch 69 that instructs traveling on a low-μ road. Here, the "low-μ road" refers to a travel road on which a vehicle is likely to slip due to idling of driving wheels 22a and 22b such as a wet road surface, a snowy road, or a frozen road.

Various control signals are output from the electronic control unit 50 via the output port. Examples of the signal output from the electronic control unit 50 include switching control signals to the transistors T11 to T16 of the inverter 34 and switching control signals to the transistors T31 and T32 of the boost converter 40.

The electronic control unit 50 computes an electrical angle θe, an angular velocity ωm, and a rotation speed Nm of the motor 32 based on the rotational position θm of the rotor of the motor 32 from the rotational position sensor 32a. The electronic control unit 50 computes a state of charge (SOC) of the battery 36 based on an integrated value of the current IB of the battery 36 from the current sensor 36b. Here, the SOC is a ratio of power capacity dischargeable from the battery 36 to the total capacity of the battery 36.

In the electric vehicle 20 according to the embodiment having the above-mentioned configuration, the electronic control unit 50 performs the following travel control. In the travel control, a required torque Td* required for a drive shaft 26 is set based on the accelerator opening Acc and the vehicle speed VS, the set required torque Td* is set as a torque command Tm* of the motor 32, and switching control of the transistors T11 to T16 of the inverter 34 is performed to drive the motor 32 in accordance with the torque command Tm*. A target voltage VH* of the high-voltage power line 42 is set to drive the motor 32 in accordance with the torque command Tm* and switching control of the transistors T31 and T32 of the boost converter 40 is performed such that the voltage VH of the high-voltage power line 42 reaches the target voltage VH*.

Control of the inverter 34 will be described below. In the embodiment, as the control of the inverter 34, any one of sinusoidal pulse width modulation (PWM) control, overmodulation PWM control, and rectangular wave control is performed. The sinusoidal PWM control is control of controlling the inverter 34 to apply (supply) a pseudo three-phase AC voltage to the motor 32, the overmodulation PWM control is control of controlling the inverter 34 to apply an overmodulation voltage to the motor 32, and the rectangular wave control is control of controlling the inverter 34 to apply a rectangular wave voltage to the motor 32. When the sinusoidal PWM control is performed and a pulse width modulation voltage based on a sinusoidal wave voltage is used as the pseudo three-phase AC voltage, a modulation factor Rm has a value ranging from 0 to about 0.61. When a pulse width modulation voltage based on a superimposed voltage acquired by superimposing 3n-th (for example, third) harmonic voltages on the sinusoidal wave voltage is used as the pseudo three-phase AC voltage, the modulation factor Rm has a value ranging from 0 to about 0.71. The modulation factor Rm is a ratio of an effective value of an output voltage of the inverter 34 (a voltage applied to the motor 32) to an input voltage (the voltage VH of the high-voltage power line 42). In the embodiment, in order to enlarge the range of the modulation factor Rm in which the sinusoidal PWM control can be performed, it is assumed that the pulse width modulation voltage based on the superimposed voltage is used as the pseudo three-phase AC voltages.

When the rectangular wave control is performed, the modulation factor Rm has a value of about 0.78. In the embodiment, in consideration thereof, it is assumed that any one of the sinusoidal PWM control, the overmodulation PWM control, and the rectangular wave control is performed based on the modulation factor Rm. The sinusoidal PWM control will be described below.

In the embodiment, first PWM control or second PWM control is performed as the sinusoidal PWM control. The first PWM control is control of generating a first PWM signal of the transistors T11 to T16 to switch the transistors T11 to T16 by comparing voltage commands Vu*, Vv*, and Vw* of the phases of the motor 32 with a carrier voltage (a triangular wave voltage). The second PWM control is control of generating a second PWM signal of the transistors T11 to T16 based on the modulation factor Rm of a voltage, a voltage phase θp, and the number of pulses Np in a predetermined period (for example, half a period or one period of an electrical angle θe of the motor 32) to switch the transistors T11 to T16. It is assumed that the first PWM signal is generated at an interval Δt1 corresponding to half a period or one period of the carrier voltage (a triangular wave voltage with a frequency of 3 kHz to 5 kHz) when the first PWM control is performed, and the second PWM signal is generated at an interval Δt2 longer than the interval Δt1 when the second PWM control is performed.

When the first PWM control is performed, the generation period of the PWM signal can be set to be shorter than when the second PWM control is performed, and thus the responsiveness (adherence to an operating point when a target operating point changes) of the motor 32 can be improved. When the second PWM control is performed, it is possible to reduce a core loss of the motor 32 or to reduce harmonics by generating the second PWM signal to reduce (for example, to minimize) the core loss of the motor 32 or generating the second PWM signal to reduce (for example, to minimize) harmonics of a voltage or a current (particularly, low-order harmonics such as rotational sixth harmonics and rotational twelfth harmonics of the motor 32), in comparison with the case in which the first PWM control is performed.

In the embodiment, it is assumed that the overmodulation PWM control is performed in the same way as the first PWM control. The overmodulation PWM control or the rectangular wave control is not essential to the disclosure and thus detailed description thereof will not be made.

Figure 2:
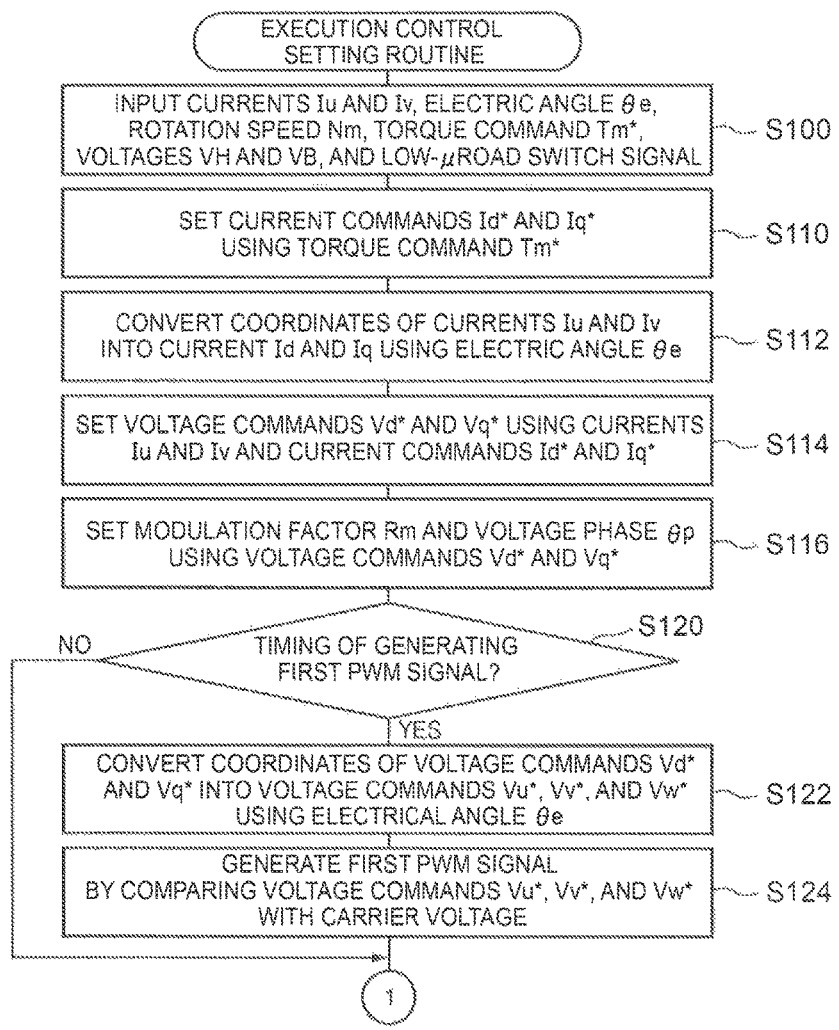
FIG. 2 is a flowchart illustrating an example of an execution control setting routine which is performed by an electronic control unit according to the embodiment.
Figure 3:
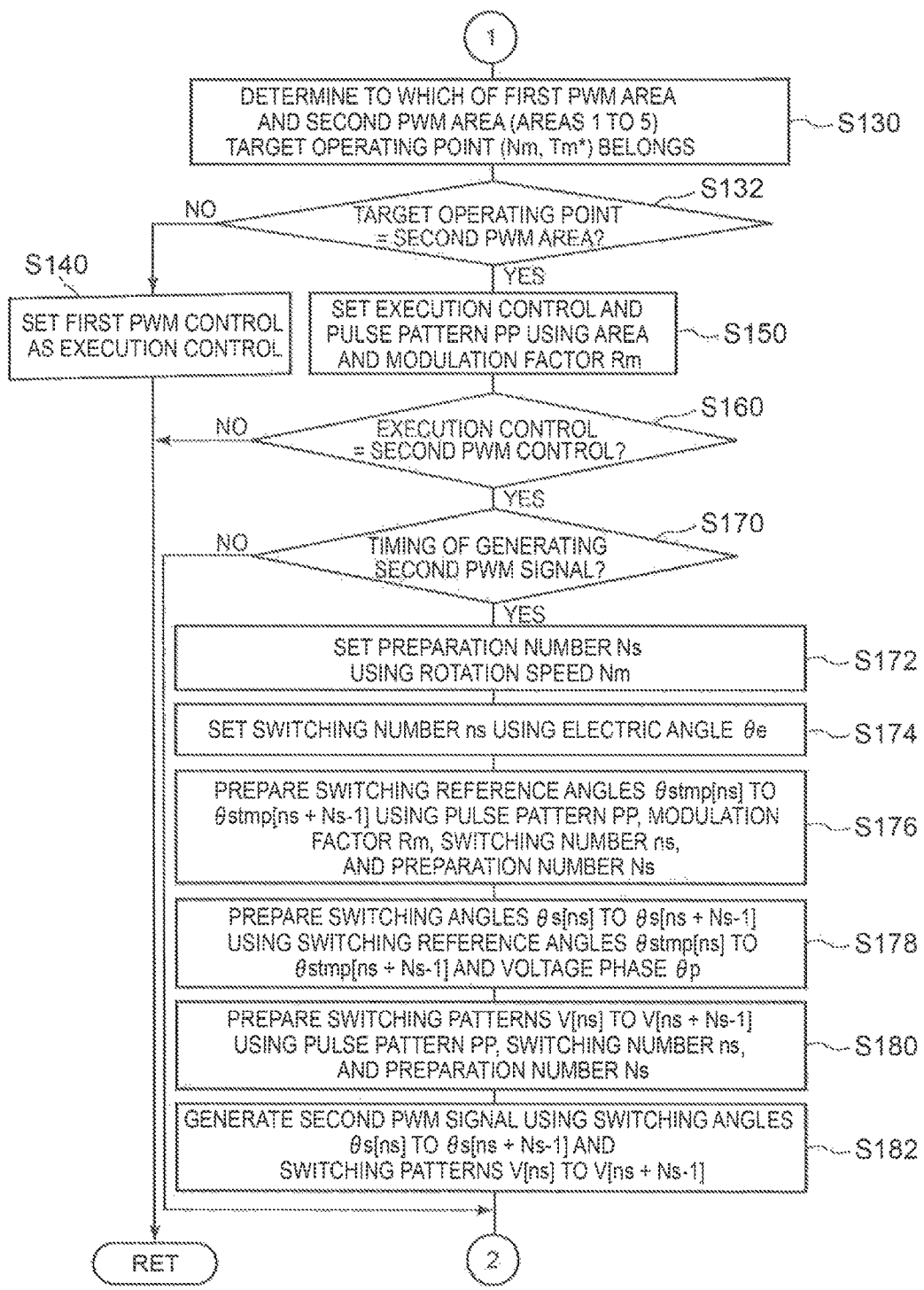
FIG. 3 is a flowchart illustrating an example of the execution control setting routine which is performed by the electronic control unit according to the embodiment.
Figure 4:
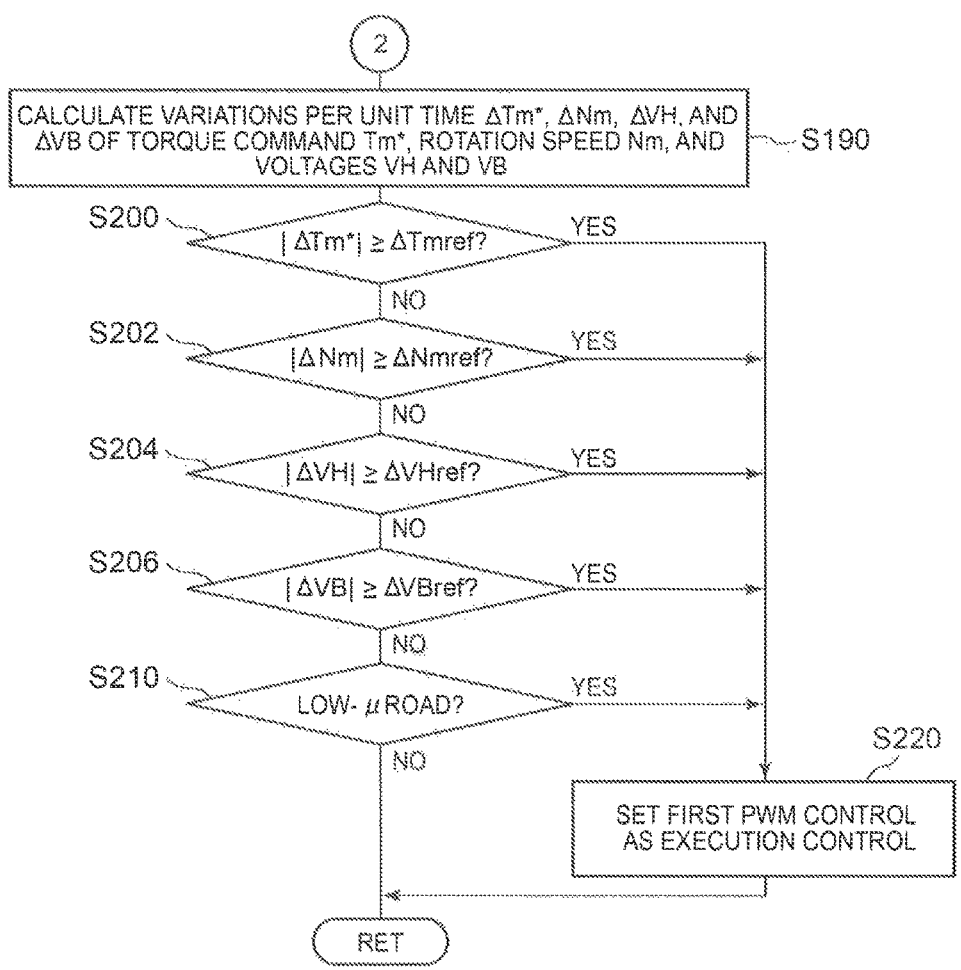
FIG. 4 is a flowchart illustrating an example of the execution control setting routine which is performed by the electronic control unit according to the embodiment.

An operation of the electric vehicle 20 according to the embodiment having the above-mentioned configuration, particularly, an operation when the first PWM control or the second PWM control is set as the execution control in performing the sinusoidal PWM control, will be described below. FIGS. 2 to 4 are flowcharts illustrating examples of an execution control setting routine which is performed by the electronic control unit 50 according to the embodiment. These routines are repeatedly performed at intervals equal to or shorter than the above-mentioned interval Δt1 (a first PWM signal generation period).

When the execution control setting routine is performed, the CPU 52 of the electronic control unit 50 first receives inputting of data such as the phase currents Iu and Iv, the electrical angle θe, the rotation speed Nm, and the torque command Tm* of the motor 32, the voltage VH of the high-voltage power line 42, the voltage VB of the battery 36, and the low-μ road switch signal (Step S100). Here, it is assumed that values detected by the current sensors 32u and 32v are input as the phase currents Iu and Iv of the motor 32. It is also assumed that values computed based on the rotational position θm of the rotor of the motor 32 detected by the rotational position sensor 32a is input as the electrical angle θe or the rotation speed Nm of the motor 32. It is also assumed that a value set by the above-mentioned drive control is input as the torque command Tm* of the motor 32. It is also assumed that a value detected by the voltage sensor 46a is input as the voltage VH of the high-voltage power line 42. It is also assumed that a value detected by the voltage sensor 36a is input as the voltage VB of the battery 36. It is also assumed that a signal (ON or OFF) from the low-μ road switch 69 is input as the low-μ road switch signal.

When data is input in this way, current commands Id* and Iq* of a d axis and a q axis are set based on the torque command Tm* of the motor 32 (Step S110). Subsequently, on the assumption that the total current flowing in the phases (the U phase, the V phase, and the W phase) of the motor 32 is 0, the phase currents Iu and Iv of the U phase and the V phase are coordinate-converted into currents Id and Iq of the d axis and the q axis (conversion of three phases into two phases) using the electrical angle θe of the motor 32 (Step S112). Then, voltage commands Vd* and Vq* of the d axis and the q axis are set based on the sum of a feedback term based on differences ΔId and ΔIq between the current commands Id* and Iq* of the d axis and the q axis and the currents Id and Iq of the d axis and the q axis and a feedforward term for cancelling out a term indicating interference between the d axis and the q axis (Step S114).

When the voltage commands Vd* and Vq* of the d axis and the q axis are set in this way, the modulation factor Rm of the voltage and the voltage phase θp are set using the set voltage commands Vd* and Vq* of the d axis and the q axis (Step S116). Here, the modulation factor Rm can be acquired by dividing a voltage command absolute value Vdq computed as a square root of the sum of the square of the voltage command Vd* of the d axis and the square of the voltage command Vq* of the q axis by the voltage VH of the high-voltage power line 42. The voltage phase θp can be acquired as an angle of a vector having the voltage commands Vd* and Vq* of the d axis and the q axis as elements with respect to the q axis.

Subsequently, it is determined whether it is time to generate the first PWM signal (Step S120). This determination can be performed depending on whether a time corresponding to the above-mentioned interval Δt1 has elapsed after the first PWM signal is previously generated. When it is determined that it is time to generate the first PWM signal, the process of generating the first PWM signal is performed (Steps S122 and S124). When it is determined that it is not time to generate the first PWM signal, the process of generating the first PWM signal is not performed.

In the process of generating the first PWM signal, the voltage commands Vd* and Vq* of the d axis and the q axis are coordinate-converted into voltage commands Vu*, Vv*, and Vw* of the phases (conversion of two phases into three phases) using the electrical angle θe of the motor 32 (Step S122), and the first PWM signal of the transistors T11 to T16 is generated by comparing the coordinate-converted voltage commands Vu*, Vv*, and Vw* of the phases with the carrier voltage (Step S124).

Figure 5:
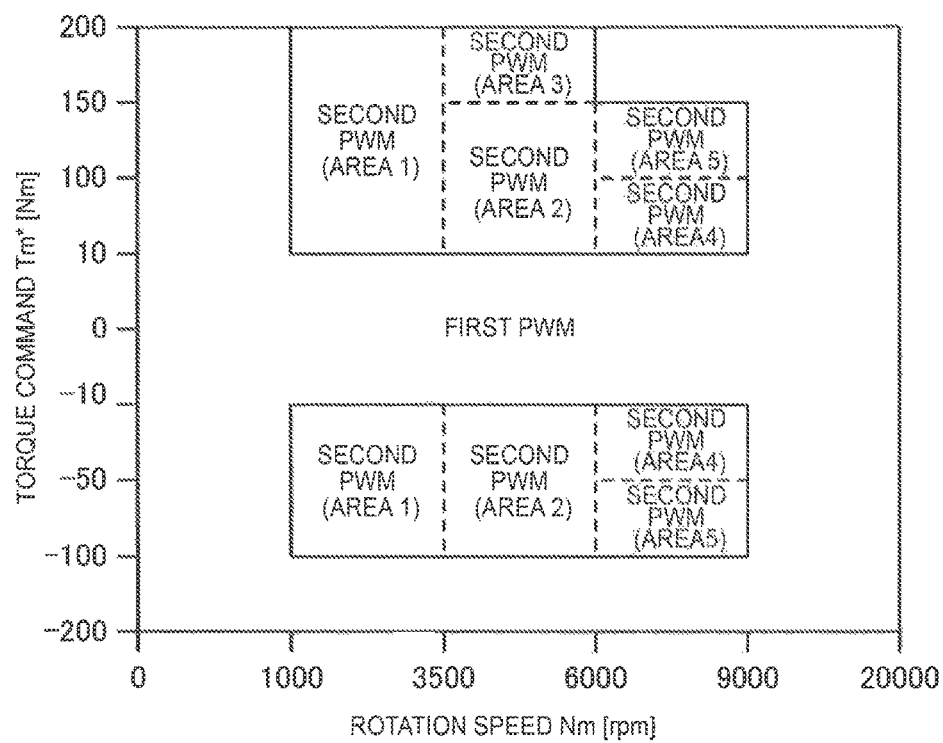
FIG. 5 is a diagram illustrating an example of a relationship between a target operating point of a motor and areas of first and second PWM control.

Then, it is determined to which of first and second PWM control area the target operating point including the rotation speed Nm and the torque command Tm* of the motor 32 belongs (Steps S130 and S132). Regarding the first and second PWM control areas, it is assumed in the embodiment that an area in which an effect of performing the second PWM control can be expected to a certain extent (can be expected depending on the modulation factor Rm) is determined as the second PWM control area and an area in which the effect cannot be expected to the certain extent (cannot be expected irrespective of any modulation factor Rm) is determined as the first PWM control area to improve the responsiveness of the motor 32, based on experiment results or analysis results where the first PWM control and second PWM control are performed on the target operating points of the motor 32. FIG. 5 is a diagram illustrating an example of a relationship between the target operating point of the motor 32 and the first and second PWM control areas. In the example illustrated in FIG. 5, it is assumed that the first and second PWM control areas are determined as follows.

It is assumed that an area in which the rotation speed Nm of the motor 32 is less than 1000 rpm or equal to or greater than 9000 rpm, an area in which the rotation speed Nm of the motor 32 ranges from 1000 rpm to 9000 rpm and the torque command Tm* ranges from −10 Nm to 10 Nm or is less than −100 Nm, and an area in which the rotation speed Nm of the motor 32 ranges from 6000 rpm to 9000 rpm and the torque command Tm* is equal to or greater than 150 Nm are determined as the first PWM control area.

It is assumed that an area in which the rotation speed Nm of the motor 32 ranges from 1000 rpm to 6000 rpm and the torque command Tm* is equal to or greater than 10 nm or ranges from −100 Nm to −10 Nm and an area in which the rotation speed Nm of the motor 32 ranges from 6000 rpm to 9000 rpm and the torque command Tm* ranges from 10 Nm to 150 Nm or ranges from −100 Nm to −10 Nm are determined as the second PWM control area. In the second PWM control area, Areas 1 to 5 are assumed to be determined as follows.

An area in which the rotation speed Nm of the motor 32 ranges from 1000 rpm to 3500 rpm, and either the torque command Tm* is equal to or greater than 10 Nm or ranges from −100 Nm to −10 Nm is determined as Area 1. An area in which the rotation speed Nm of the motor 32 ranges from 3500 rpm to 6000 rpm, and either the torque command Tm* ranges from 10 Nm to 150 Nm or ranges from −100 Nm to −10 Nm is determined as Area 2. An area in which the rotation speed Nm of the motor 32 ranges from 3500 rpm to 6000 rpm and the torque command Tm* is equal to or greater than 150 Nm is determined as Area 3. An area in which the rotation speed Nm of the motor 32 ranges from 6000 rpm to 9000 rpm, and either the torque command Tm* ranges from 10 Nm to 100 Nm or ranges from −50 Nm to −10 Nm is determined as Area 4. An area in which the rotation speed Nm of the motor 32 ranges from 6000 rpm to 9000 rpm, and either the torque command Tm* ranges from 100 Nm to 150 Nm or ranges from −100 Nm to −50 Nm is determined as Area 5.

In FIG. 5, the values of the rotation speed Nm of the motor 32 and the torque command Tm*, partitioning of the first PWM control area and the second PWM control area, and partitioning of the areas in the second PWM control area (which includes the number of areas) are only examples and can be appropriately set depending on the specifications of the motor 32, the inverter 34, and the like.

When it is determined in Steps S130 and S132 that the target operating point of the motor 32 belongs to the first PWM control area, the first PWM control is set as the execution control (Step S140) and this routine ends. In this case, the transistors T11 to T16 of the inverter 34 are switched using the first PWM signal. Accordingly, it is possible to improve responsiveness of the motor 32.

When it is determined in Steps S130 and S132 that the target operating point of the motor 32 belongs to the second PWM control area (Areas 1 to 5), one of the first PWM control and the second PWM control is set as the execution control based on the corresponding area of Areas 1 to 5 and the modulation factor Rm and a pulse pattern PP is set when the second PWM control is set as the execution control (Step S150). Here, the pulse pattern PP is a combination of a pulse type PT in the second PWM control and the number of pulses Np. In the embodiment, it is assumed that a type (second PWMa) of generating the second PWM signal to reduce (for example, to minimize) the core loss of the motor 32 and a type (second PWMb) of generating the second PWM signal to reduce (for example, to minimize) harmonics (particularly, low-order harmonics) of a voltage or a current are used as the pulse type PT.

Figure 6:
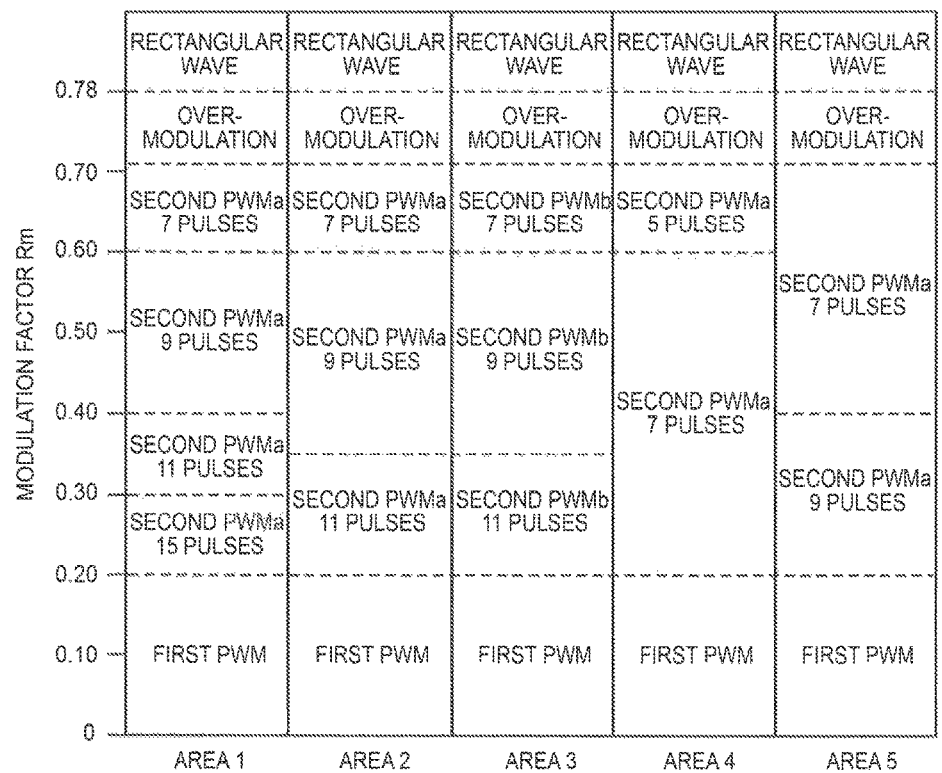
FIG. 6 is a diagram illustrating an example of relationships between Areas 1 to 5, a modulation factor Rm, execution control, and a pulse pattern PP.

Regarding the execution control and the pulse pattern PP, it is assumed in the embodiment that relationships between Areas 1 to 5, the modulation factor Rm, the execution control, and the pulse pattern PP is predetermined and stored as a map in the ROM 54 and the execution control and the pulse pattern PP are set based on the map when an area and a modulation factor Rm are given. An example of the relationships between Areas 1 to 5, the modulation factor Rm, the execution control, and the pulse pattern PP is illustrated in FIG. 6. In FIG. 6, areas of the rectangular wave control and the overmodulation control (areas in which the modulation factor Rm ranges from about 0.71 to 0.78) are also illustrated for reference.

As illustrated in the drawing, it is assumed that the first PWM control is set as the execution control in an area in which the modulation factor Rm is less than 0.20 in Areas 1 to 5 and the second PWM control is set as the execution control in an area in which the modulation factor Rm ranges from 0.20 to 0.71. This is because the inventor found that an effect of performing the second PWM control is relatively small in an area in which the modulation factor Rm is less than a predetermined modulation factor Rmref (0.20 in the example illustrated in FIG. 6). In the area in which the modulation factor Rm ranges from 0.20 to about 0.71, it is assumed that the second PWMa is selected as the pulse type PT in Areas 1, 2, 4, and 5 and the second PWMb is selected as the pulse type PT in Area 3. In the area in which the modulation factor Rm ranges from 0.20 to about 0.71, it is assumed that the larger the modulation factor Rm becomes, the smaller the number of pulses Np becomes. For this reason, the total loss of the motor 32 and the inverter 34 is set to be reduced (for example, to be minimized) depending on the modulation factor Rm in consideration of the fact that the smaller the number of pulses Np becomes, the larger a ripple current becomes and the larger the loss of the motor 32 is likely to be and the fact that the larger the number of pulses Np, the larger the number of switching times of the transistors T11 to T16 and the larger the loss of the inverter 34 is likely to be. In the embodiment, in the area in which the modulation factor Rm is relatively large, the number of pulses Np is relatively reduced in consideration of the fact that the loss of the motor 32 is unlikely to increase and the total loss of the motor 32 and the inverter 34 is unlikely to increase in comparison with an area in which the number of pulses Np is relatively small.

In FIG. 6, boundaries of the number of pulses Np are only examples and can be appropriately set depending on the specifications of the motor 32, the inverter 34, and the like.

Then, it is determined that the execution control is the first PWM control or the second PWM control (Step S160), and this routine ends when it is determined that the execution control is the first PWM control. In this case, the transistors T11 to T16 of the inverter 34 are switched using the first PWM signal of the first PWM control. In this way, when the target operating point of the motor 32 belongs to the second PWM control area and the modulation factor Rm is less than the predetermined modulation factor Rmref (when the effect of performing the second PWM control is relatively small), it is possible to more suitably drive the motor 32 by performing the first PWM control to improve the responsiveness of the motor 32.

When it is determined in Step S160 that the execution control is the second PWM control, it is determined whether it is time to generate the second PWM signal (Step S170). This determination can be performed depending on whether a time corresponding to the interval Δt2 has elapsed after the first PWM signal is previously generated. The interval Δt2 can be set to, for example, a value computed by Expression (1) based on a previous electrical angle (previous θe), a previous angular velocity (previous ωm), and a switching angle (previous θs[ns+Ns−1]) to be described later. When it is determined that it is time to generate the second PWM signal, the process of generating the second PWM signal is performed (Steps S172 to S182). When it is determined that it is not time to generate the second PWM signal, the process of generating the second PWM signal is not performed.

$$\Delta t2=(\text{previous } \theta s[ns+Ns-1]-\text{previous } \theta e)/\text{previous } \omega m \quad (1)$$

In the process of generating the second PWM signal, first, a preparation number Ns is set based on the rotation speed Nm of the motor 32 (Step S172). Here, the preparation number Ns is a value indicating how many switching reference angles θstmp, switching angles θs, or switching patterns V to prepare (set) to be described later. The preparation number Ns is set to be larger when the rotation speed Nm of the motor 32 is high than when the rotation speed is low, that is, to become larger as the rotation speed Nm of the motor 32 becomes higher. This is because when the interval Δt2 is set to a time within a predetermined range and the rotation speed Nm of the motor 32 is high, the number of switching times at the interval Δt2 can be set to be larger than when the rotation speed is low. The preparation number Ns may be set to a fixed value. In this case, the interval Δt2 is shorter when the rotation speed Nm (the angular velocity ωm) is high than when the rotation speed is low.

Subsequently, a switching number ns is prepared (set) based on the electrical angle θe of the motor 32 (Step S174). Here, the switching number ns is a number which is used to set a switching reference angle θstmp, a switching angle θs, and a switching pattern V which will be described later and is prepared within a range of value 1 to value N. Value N refers to the number of switching reference angles θstmp, switching angles θs, or switching patterns V in one period of the electrical angle θe of the motor 32 and is a product of the number of pulses Np of the pulse pattern PP, value 2 (rising and falling of each pulse), and value 3 (the U phase, the V phase, and the W phase).

Figure 7:
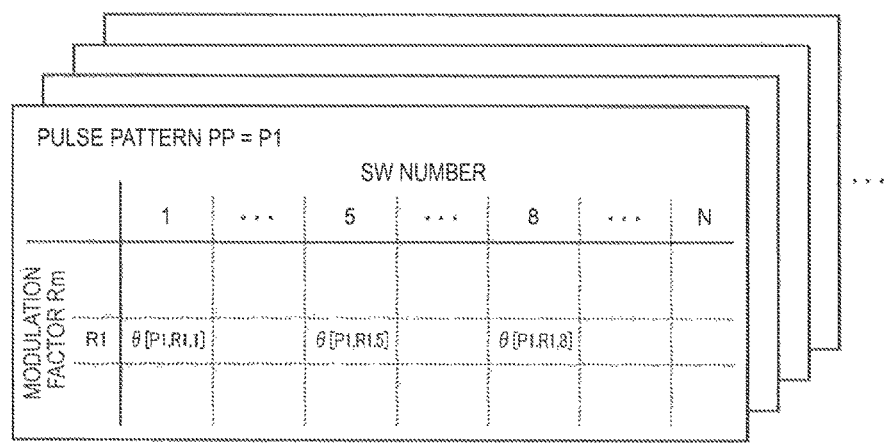
FIG. 7 is a diagram illustrating an example of relationships between a pulse pattern PP, a modulation factor Rm, and switching reference angles θstmp of switching numbers 1 to N.

Switching reference angles θstmp[ns] to θstmp[ns+Ns−1] of the switching numbers ns to (ns+Ns−1) are prepared (set) based on the pulse pattern PP, the modulation factor Rm, the switching number ns, and the preparation number Ns (Step S176). Here, the switching reference angle θstmp is a reference angle of the switching angle θs. The switching angle θs is an angle for switching phase voltages of the phases (ON and OFF of the transistors for the corresponding phase among the transistors T11 to T16, for example, ON and OFF of the transistors T11 and T14 for the U phase) of the motor 32. Regarding the switching reference angles θstmp[ns] to θstmp[ns+Ns−1], it is assumed in the embodiment that the relationships between the pulse pattern PP, the modulation factor Rm, and the switching reference angle θstmp of switching numbers 1 to N is predetermined and stored as a map in the ROM 54 and the switching reference angles θstmp[ns] to θstmp[ns+Ns−1] of the switching numbers ns to (ns+Ns−1) are derived and set based on the map when the pulse pattern PP, the modulation factor Rm, the switching number ns, and the preparation number Ns are given. An example of the relationships between the pulse pattern PP, the modulation factor Rm, and the switching reference angle θstmp of the switching numbers 1 to N is illustrated in FIG. 7. In FIG. 7, the values of the switching reference angle θstmp are illustrated as values θ[PP, Rm, n] (where n ranges from 1 to N). In FIG. 7, when the pulse pattern PP is pattern P1, the modulation factor Rm has a value R1, the switching number ns has a value 5, and the preparation number Ns has a value 4, the values θ[P1, R1, 5] to θ[P1, R1, 8] of the switching numbers 5 to 8 are set as the switching reference angles θstmp[5] to θstmp[8].

When the switching reference angles θstmp[ns] to θstmp[ns+Ns−1] are set in this way, the voltage phases θp are added to the set switching reference angles θstmp[ns] to θstmp[ns+Ns−1] to set the switching angles θs[ns] to θs[ns+Ns−1] (Step S178).

Subsequently, the switching patterns V[ns] to V[ns+Ns−1] of the switching numbers ns to (ns+Ns−1) are set based on the pulse pattern PP, the switching number ns, and the preparation number Ns (Step S180). Here, the switching pattern V is a pattern indicating a combination of ONs and OFFs of the transistors T11 to T13 and Patterns V0 to V7 are used. The reason for using the combination of ONs and OFFs of the transistors T11 to T13 instead of the combination of ONs and OFFs of the transistors T11 to T16 is that the corresponding upper arm and the corresponding lower arm among the transistors T11 to T16 are not simultaneously turned on in general and omission of the combination of ONs and OFFs of the transistors T14 to T16 does not cause any problem. Patterns V0 to V7 are as follows.

Pattern V0: All the transistors T11 to T13 are turned off.
Pattern V1: The transistors T11 and T12 are turned off and the transistor T13 is turned on.
Pattern V2: The transistors T11 and T13 are turned off and the transistor T12 is turned on.
Pattern V3: The transistor T11 is turned off and the transistors T12 and T13 are turned on.
Pattern V4: The transistor T11 is turned on and the transistors T12 and T13 are turned off.
Pattern V5: The transistors T11 and T13 are turned on and the transistor T12 is turned off.
Pattern V6: The transistors T11 and T12 are turned on and the transistor T13 is turned off.
Pattern V7: All the transistors T11 to T13 are turned on.

Figure 8:
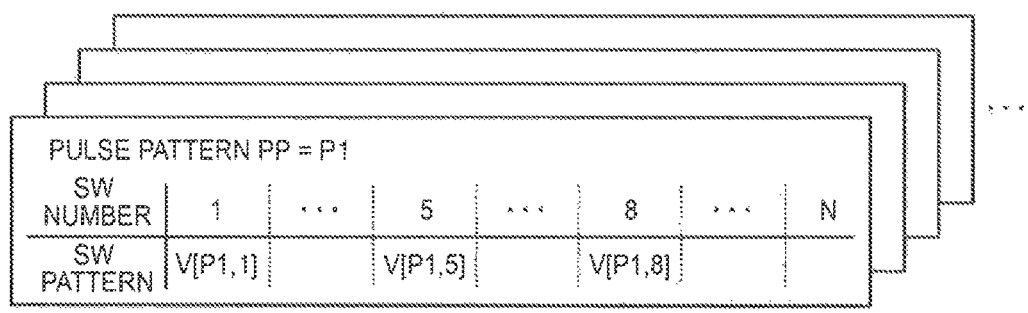
FIG. 8 is a diagram illustrating an example of relationships between a pulse pattern PP and switching patterns V of the switching numbers 1 to N.

Regarding the switching patterns V[ns] to V[ns+Ns−1], it is assumed in the embodiment that a relationship between the pulse pattern PP and the switching patterns V of the switching numbers 1 to N is predetermined and stored as a map in the ROM 54 and the switching patterns V[ns] to V[ns+Ns−1] of the switching numbers ns to (ns+Ns−1) are derived and set based on the map when the pulse pattern PP, the switching number ns, and the preparation number Ns are given. An example of the relationship between the pulse pattern PP and the switching patterns V of the switching numbers 1 to N is illustrated in FIG. 8. In FIG. 8, the values of the switching angles θs are illustrated as values θ[PP, n] (where n ranges from 1 to N). In FIG. 8, when the pulse pattern PP is Pattern P1, the switching number ns has a value 5, and the preparation number Ns has a value 4, the switching patterns V[P1, 5] to V[P1, 8] of the switching numbers 5 to 8 are set as the switching patterns V[5] to V[8].

Figure 9:
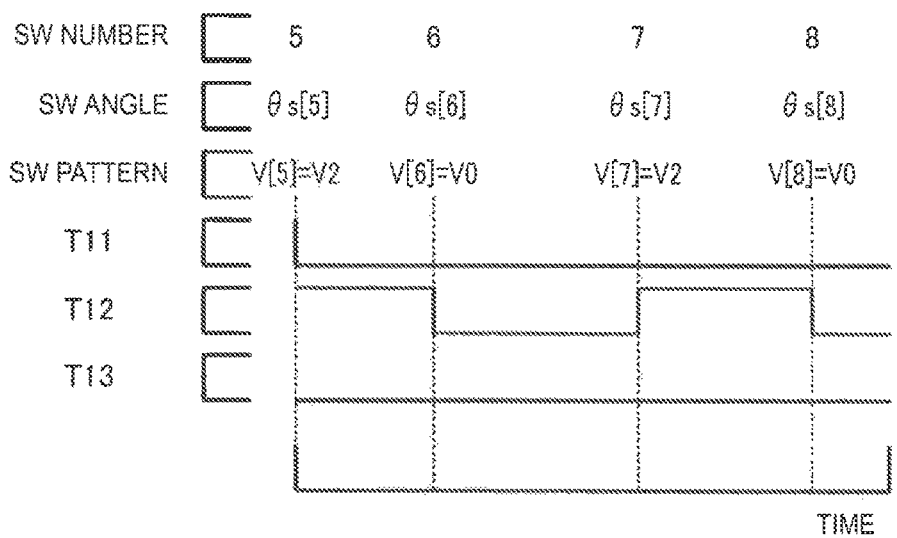
FIG. 9 is a diagram illustrating an example of relationships between switching numbers 5 to 8, switching angles θs[5] to θs[8], switching patterns V[5] to V[8], and second PWM signals of transistors T11 to T13 when the switching number ns has a value of 5 and the preparation number Ns has a value of 4.

When the switching angles θs[ns] to θs[ns+Ns−1] and the switching patterns V[ns] to V[ns+Ns−1] of the switching numbers ns to (ns+Ns−1) are set in this way, the second PWM signal of the transistors T11 to T16 is generated based on the set switching angles θs[ns] to θs[ns+Ns−1] and the set switching patterns V[ns] to V[ns+Ns−1] (Step S182). An example of relationships between the switching numbers 5 to 8, the switching angles θs[5] to θs[8], the switching patterns V[5] to V[8], and the second PWM signal of the transistors T11 to T13 when the switching number ns has a value 5 and the preparation number Ns has a value 4 is illustrated in FIG. 9.

Then, variations per unit time ΔTm*, ΔNm, ΔVH, and ΔVB of the torque command Tm* of the motor 32, the rotation speed Nm of the motor 32, the voltage VH of the high-voltage power line 42, and the voltage VB of the battery 36 are calculated (Step S190). Subsequently, the absolute value of the variation ΔTm* is compared with a threshold value ΔTmref (Step S200), the absolute value of the variation ΔNm is compared with a threshold value ΔNmref (Step S202), the absolute value of the variation ΔVH is compared with a threshold value ΔVHref (Step S204), the absolute value of the variation ΔVB is compared with a threshold value ΔVBref (Step S206), and it is determined whether the travel road is a low-μ road (Step S210).

Here, the threshold values ΔTmref, ΔNmref, ΔVHref, and ΔVBref are threshold values which are used to determine whether the torque command Tm* of the motor 32, the rotation speed Nm of the motor 32, the voltage VH of the high-voltage power line 42, and the voltage VB of the battery 36 have suddenly changed. The determination of whether the travel road is a low-μ road can be performed by checking whether the low-μ road switch signal from the low-μ road switch 89 is in an ON state, comparing a frictional coefficient of the travel road estimated based on the rotational acceleration of the drive shaft 26 with a threshold value, or comparing the frictional coefficient of the travel road estimated based on the rotational acceleration of the driving wheels 22a and 22b with a threshold value. The processes of Step S200 to S206 are processes of determining whether a state of a drive system including the motor 32, the inverter 34, the battery 36, and the boost converter 40 suddenly changes, and the process of Step S210 is a process of determining whether a sudden change of the state of the drive system is predicted.

When it is determined in Steps S200 to S206 that the absolute value of the variation ΔTm* is less than the threshold value ΔTmref, the absolute value of the variation ΔNm is less than the threshold value ΔNmref, the absolute value of the variation ΔVH is less than the threshold value ΔVHref, and the absolute value of the variation ΔVB is less than the threshold value ΔVBref and it is determined in Step S210 that the travel road is not a low-μ road, it is determined that the state of the drive system is not suddenly changed, it is determined that the sudden change of the state of the drive system is not predicted, and this routine ends. Since it is now considered that the execution control is determined to be the second PWM control in Step S160, the transistors T11 to T116 of the inverter 34 are switched using the second PWM signal. Accordingly, it is possible to reduce the core loss of the motor 32 or to reduce the harmonics of the voltage or the current depending on the pulse pattern PP including the pulse type PT (the second PWMa or the second PWMb) and the number of pulses Np. As a result, it is possible to more suitably drive the motor 32.

When it is determined in Step S200 that the absolute value of the variation ΔTm* is equal to or greater than the threshold value ΔTmref, it is determined in Step S202 that the absolute value of the variation ΔNm is equal to or greater than the threshold value ΔNmref, it is determined in Step S204 that the absolute value of the variation ΔVH is equal to or greater than the threshold value ΔVHref, or it is determined in Step S206 that the absolute value of the variation ΔVB is equal to or greater than the a threshold value ΔVBref (Step S206), it is determined that the state of the drive system suddenly changes, the first PWM control is reset as the execution control (Step S220), and the routine ends. When it is determined in Step S210 that the travel road is a low-μ road, it is determined that a sudden change of the state of the drive system is predicted, the first PWM control is reset as the execution control (Step S220), and the routine ends. As described above, when the second PWM control is performed, the responsiveness of the motor 32 becomes lower than that when the first PWM control is performed. In the embodiment, it is assumed that the first PWM control is performed when the state of the drive system suddenly changes or a sudden change of the state of the drive system is predicted in consideration of the above-mentioned fact. Accordingly, it is possible to improve the responsiveness of the motor 32 and to more suitably drive the motor 32.

In the electric vehicle 20 according to the above-mentioned embodiment, the first PWM control is performed when the sinusoidal PWM control is performed and the target operating point (the rotation speed Nm and the torque command Tm*) of the motor 32 belongs to the first PWM control area, and the second PWM control is basically performed when the target operating point of the motor 32 belongs to the second PWM control area. Accordingly, it is possible to improve the responsiveness of the motor 32 when the first PWM control is performed, and it is possible to reduce the core loss of the motor 32 or to reduce the harmonics of the voltage or the current when the second PWM control is performed. Since an area in which the effect of performing the second PWM control can be expected to a certain extent is determined to be the second PWM control area and an area in which the effect cannot be expected to the certain extent is determined to be the first PWM control area for the purpose of improvement in the responsiveness of the motor 32, it is possible to more suitably drive the motor depending on the target operating point.

In the electric vehicle 20 according to the embodiment, when the sinusoidal PWM control is performed, the target operating point of the motor 32 belongs to the second PWM control area, and the modulation factor Rm is less than a predetermined modulation factor Rmref, the first PWM control is performed. Accordingly, when the effect of performing the second PWM control is relatively small, it is possible to improve the responsiveness of the motor 32 and to more suitably drive the motor 32.

In the electric vehicle 20 according to the embodiment, when the sinusoidal PWM control is performed, the target operating point of the motor 32 belongs to the second PWM control area, and the state of the drive system suddenly changes or a sudden change of the state of the drive system is predicted, the first PWM control is performed. When the second PWM control is performed, the responsiveness of the motor 32 is lower than that when the first PWM control is performed. Accordingly, by performing the first PWM control to improve the responsiveness of the motor 32, it is possible to more suitably drive the motor 32.

In the electric vehicle 20 according to the embodiment, when the sinusoidal PWM control is performed and it is determined in Steps S130 and S132 of FIG. 3 that the target operating point of the motor 32 belongs to the second PWM control area, it is assumed that the second PWM control is set as the execution control when it is determined in Step S150 that the modulation factor Rm is equal to or greater than a predetermined modulation factor Rmref, and the first PWM control is set as the execution control when the modulation factor Rm is less than the predetermined modulation factor Rmref. However, the second PWM control may be set as the execution control regardless of whether the modulation factor Rm is equal to or greater than or less than the predetermined modulation factor Rmref in Step S150. In this case, as for an area in which the modulation factor Rm is less than the predetermined modulation factor Rmref, the pulse pattern PP can be set based on the area (the target operating point of the motor 32) and the modulation factor Rm.

In the electric vehicle 20 according to the embodiment, when the sinusoidal PWM control is performed and the second PWM control is set as the execution control in Step S150 of FIG. 3, it is determined in Steps S200 to S206 whether the state of the drive system has suddenly changed using the variations per unit time $\Delta Tm^*$, $\Delta Nm$, $\Delta VH$, and $\Delta VB$ of the torque command $Tm^*$ of the motor 32, the rotation speed Nm of the motor 32, the voltage VH of the high-voltage power line 42, and the voltage VB of the battery 36. However, it may be determined whether the state of the drive system has suddenly changed using a part of the variations per unit time $\Delta Tm^*$, $\Delta Nm$, $\Delta VH$, and $\Delta VB$ of the torque command $Tm^*$ of the motor 32, the rotation speed Nm of the motor 32, the voltage VH of the high-voltage power line 42, and the voltage VB of the battery 36. It may be determined whether the state of the drive system has suddenly changed using other parameters such as variations per unit time of the required power $Pm^*$ ($=Tm^* \cdot Nm$) of the motor 32, the effective values of the phase currents Iu and Iv of the motor 32, the current IL flowing in the reactor L of the boost converter 40, and the voltage VL of the low-voltage power line 44.

In the electric vehicle 20 according to the embodiment, when the sinusoidal PWM control is performed and the second PWM control is set as the execution control in Step S150 of FIG. 3, it is determined in Steps S200 to S206 whether the state of the drive system has suddenly changed and it is determined in Step S210 whether a sudden change of the state of the drive system is predicted. However, the determination of whether the state of the drive system has suddenly changed may be performed, but the determination of whether a sudden change of the state of the drive system is predicted may not be performed. The determination of whether a sudden change of the state of the drive system is predicted may be performed, but the determination of whether the state of the drive system has suddenly changed may not be performed. Neither of the determination of whether the state of the drive system has suddenly changed and the determination of whether a sudden change of the state of the drive system is predicted may not be performed.

In the electric vehicle 20 according to the embodiment, two types which include the type (the second PWMa) of generating the second PWM signal to reduce the core loss of the motor 32 and the type (the second PWMb) of generating the second PWM signal to reduce the harmonics of the voltage or the current are used as the pulse type PWM of the pulse pattern PP which is used to generate the second PWM signal. However, three or more pulse types PT may be used as the pulse type PT. In this case, for example, a type of generating the second PWM signal to reduce the core loss of the motor 32, a type of generating the second PWM signal to reduce an ohmic loss of the motor 32, a type of generating the second PWM signal to reduce a torque ripple of the motor 32, a type of generating the second PWM signal to reduce a loss of the inverter 34, a type of generating the second PWM signal to reduce a total loss of the motor 32 and the inverter 34, a type of generating the second PWM signal to reduce harmonics of a voltage, and a type of generating the second PWM signal to reduce harmonics of a current may be used. Only one type may be used as the pulse type PT. In this case, a pattern based on only the number of pulses Np can be set as the pulse pattern PP.

In the electric vehicle 20 according to the embodiment, when generating the second PWM signal, the switching reference angle $\theta$stmp is set based on the pulse pattern PP (the pulse type PT and the number of pulses Np) and the modulation factor Rm and the switching reference angle $\theta$stmp is corrected using the voltage phase $\theta$p to set the switching angle $\theta$s. However, the switching angle $\theta$s may be directly set based on the pulse pattern PP, the modulation factor Rm, and the voltage phase $\theta$p.

In the electric vehicle 20 according to the embodiment, the boost converter 40 is disposed between the battery 36 and the inverter 34, but the boost converter 40 may not be disposed.

Figure 10:
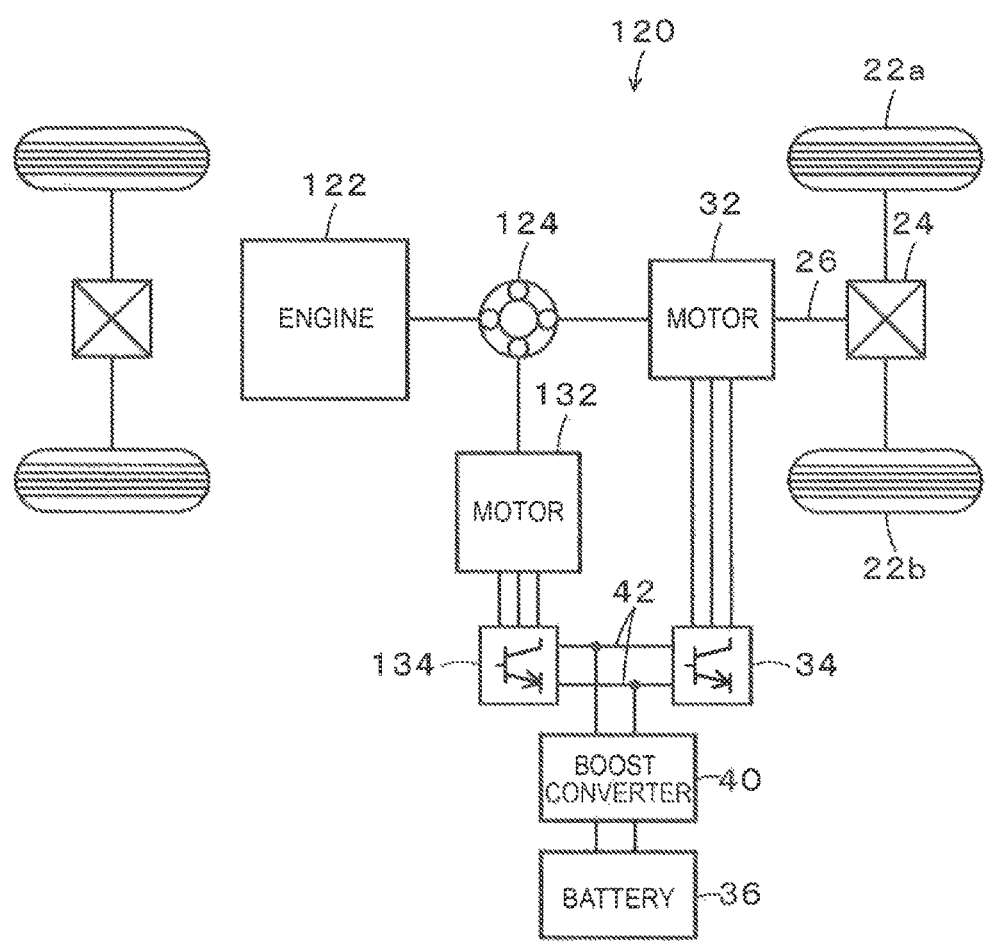
FIG. 10 is a diagram schematically illustrating a configuration of a hybrid vehicle according to a modified example.

In the electric vehicle 20 according to the embodiment, a configuration including the motor 32, the inverter 34, and the battery 36 is employed. However, as illustrated in a hybrid vehicle 120 according to a modified example of FIG. 10, a configuration including an engine 122, a planetary gear 124, a motor 132, and an inverter 134 in addition to the motor 32 and the inverter 34 may be employed. Here, the motor 132 is connected to a sun gear of the planetary gear 124, the engine 122 is connected to a carrier thereof, and the drive shaft 26 and the motor 32 are connected to a ring gear thereof. The inverter 134 is connected to the motor 132 and is also connected to the high-voltage power line 42.

In the embodiment, the motor 32 functions as the "motor," the inverter 34 functions as the "inverter," the battery 36 functions as the "battery," and the electronic control unit 50 functions as the "electronic control unit."

While aspects of the disclosure have been described with reference to the embodiment, the embodiment is only a specific example of the disclosure. The disclosure is not limited to the embodiment, and can be modified in various forms without departing from the scope of the disclosure.

The disclosure is applicable to the industry of manufacturing vehicles.

What is claimed is:
1. A vehicle comprising:
   a motor configured to drive the vehicle;
   an inverter configured to drive the motor by switching a plurality of switching elements;
   a battery configured to exchange power with the motor via the inverter; and
   an electronic control unit configured to control the inverter based on a torque command of the motor, the electronic control unit being configured to
      perform a first PWM control of generating a first PWM signal of the plurality of switching elements to switch the plurality of switching elements by comparing voltage commands of phases based on the torque command with a carrier voltage when a target operating point including a rotation speed and the torque command of the motor is outside a predetermined area, and select and perform a second PWM control of generating a second PWM signal of the plurality of switching elements to switch the plurality of switching elements based on a modulation factor of a voltage, a voltage phase, and the number of pulses in a predetermined period of an electrical angle of the motor, wherein the modulation factor and the voltage phase are based on the torque command, or the first PWM control when the target operating point is inside the predetermined area.

2. The vehicle according to claim 1, wherein the electronic control unit is configured to set a switching angle based on the modulation factor, the number of pulses, and the voltage phase, to set a switching pattern based on the number of pulses, and to generate the second PWM signal based on the switching angle and the switching pattern when generating the second PWM signal.

3. The vehicle according to claim 1, wherein the electronic control unit is configured to generate the first PWM signal at a first interval corresponding to half a period of the carrier voltage or a period of the carrier voltage when performing the first PWM control and to generate the second PWM signal at a second interval longer than the first interval when performing the second PWM control.

4. The vehicle according to claim 1, wherein the electronic control unit is configured to perform the first PWM control when the target operating point is inside the predetermined area and the modulation factor is less than a predetermined modulation factor.

5. The vehicle according to claim 1, wherein the electronic control unit is configured to set the number of pulses based on the target operating point and the modulation factor when the target operating point is inside the predetermined area.

6. The vehicle according to claim 5, wherein the electronic control unit is configured to set the number of pulses based on the target operating point and the modulation factor, to set one of a plurality of types including a type of generating the second PWM signal to reduce a core loss of the motor and a type of generating the second PWM signal to reduce harmonics as a selected type, and to generate the second PWM signal based on the modulation factor, the voltage phase, the number of pulses, and the selected type when the target operating point is inside the predetermined area.

7. The vehicle according to claim 1, wherein the electronic control unit is configured to perform the first PWM control when the target operating point is inside the predetermined area, a state of a drive system including the motor, the inverter, and the battery suddenly changes, or when a sudden change of the drive system is predicted.

8. The vehicle according to claim 7, wherein the electronic control unit is configured to determine that the state of the drive system has suddenly changed and to perform the first PWM control when a variation per unit time of at least one of the torque command, the rotation speed, the voltage of the inverter, and the voltage of the battery is greater than a threshold value.

9. The vehicle according to claim 7, wherein the electronic control unit is configured to determine that the sudden change of the state of the drive system is predicted and to perform the first PWM control when a travel road is a low-μ road.

10. The vehicle according to claim 5, wherein the electronic control unit is configured to set the number of pulses based on the target operating point and the modulation factor, to set one of a plurality of types including a type of generating the second PWM signal to reduce a core loss of the motor, a type of generating the second PWM signal to reduce an ohmic loss of the motor, a type of generating the second PWM signal to reduce a torque ripple of the motor, a type of generating the second PWM signal to reduce a loss of the inverter, a type of generating the second PWM signal to reduce a total loss of the motor and the inverter, a type of generating the second PWM signal to reduce harmonics of a voltage, and a type of generating the second PWM signal to reduce harmonics of a current as a selected type, and to generate the second PWM signal based on the modulation factor, the voltage phase, the number of pulses, and the selected type when the target operating point is inside the predetermined area.

* * * * *